Dec. 15, 1931.   J. BURKHARDT   1,836,224
SHUTTER FOR PROJECTING MACHINES
Filed Feb. 18, 1929

INVENTOR
Jakob Burkhardt
BY Chappell Earl
ATTORNEYS

Patented Dec. 15, 1931

1,836,224

UNITED STATES PATENT OFFICE

JAKOB BURKHARDT, OF DETROIT, MICHIGAN, ASSIGNOR TO THIRD DIMENSION PICTURES, INC., OF NEW YORK, N. Y., A CORPORATION OF NEW YORK

SHUTTER FOR PROJECTING MACHINES

Application filed February 18, 1929. Serial No. 340,833.

The main objects of this invention are:

First, to provide an improved shutter mechanism for motion picture projecting machines having double lenses whereby two pictures may be projected simultaneously in superimposed relation, such as illustrated in my application for Letters Patent, Serial No. 331,309, filed January 9, 1929.

Second, to provide an improved shutter for motion picture projecting machines having a pair of projecting lenses disposed side by side in which the shutters open and close on a medial line of the lenses.

Third, to provide in a motion picture projecting machine an improved shutter which has a rapid opening and closing action.

Objects relating to details and economies of my invention will appear from the description to follow. The invention is defined and pointed out in the claim.

A structure which is a preferred embodiment of my invention is illustrated in the accompanying drawings, in which.

Figure 1:
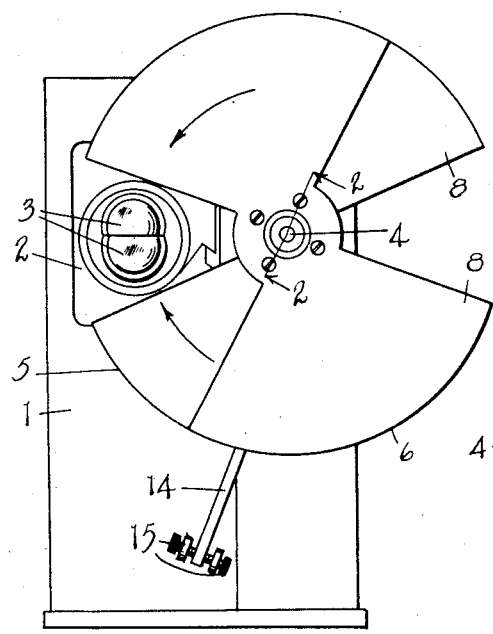
Fig. 1 is a front perspective view of a projecting machine embodying the features of my invention, the parts other than the shutter being shown mainly in conventional form.
Figure 2:
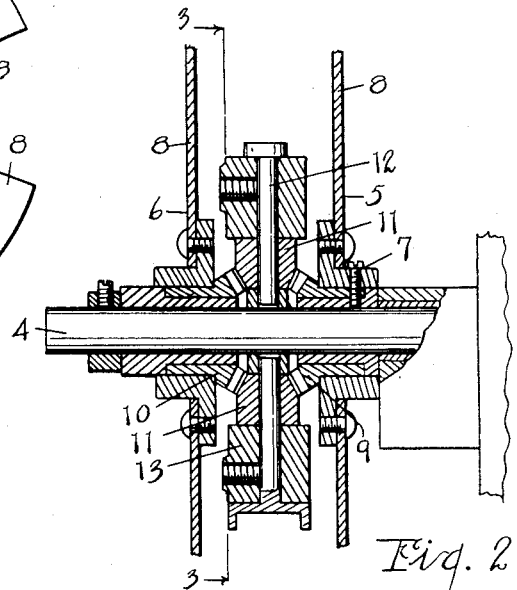
Fig. 2 is a fragmentary section on line 2—2 of Figs. 1 and 3.
Figure 3:
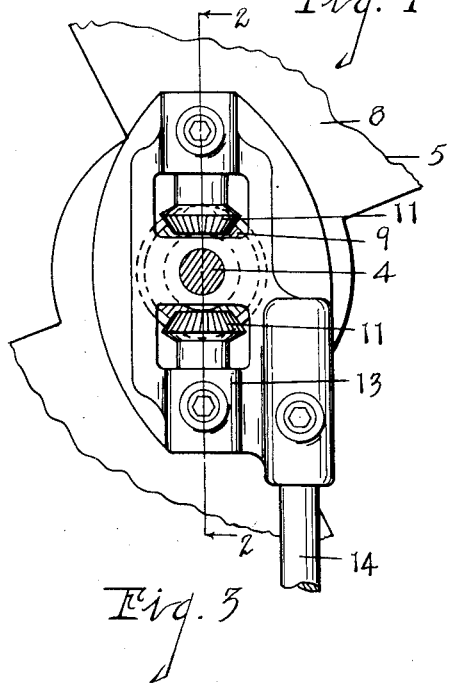
Fig. 3 is a fragmentary view partially in section on line 3—3 of Fig. 2.

Referring to the drawings, 1 represents the cabinet of a motion picture projecting machine, 2 the window, and 3, 3 a pair of lenses disposed side by side, these lenses being preferably those illustrated and described in my application for Letters Patent, Serial No. 331,309, filed January 9, 1929, but it is desired to point out that my improvements are desirable and readily adapted for use in standard types of motion picture projecting machines.

The shaft 4 is a live or driven shaft, the driving means not being illustrated. On this shaft I mount a pair of shutters designated generally by the numerals 5 and 6, the shutter 5 being secured to the shaft to rotate therewith as by the pin 7 and the shutter 6 being rotatable on the shaft. These shutters are provided with segmental wings 8 disposed in diametrically opposed relation, the wings of the two shutters being duplicates.

Beveled gears 9 and 10 are secured in opposed facing relation to the hub portions of the shutters and these are connected by the beveled idler gears 11, the spindles 12 of these gears being carried by a yoke-like frame or spider 13 having an arm 14 disposed between the adjusting screws 15.

With this arrangement the gear 9 constitutes a driving gear rotating the gears 11 and consequently the gear 10 in the opposite direction from that of the gear 9 and at the same speed. The spindle or shaft 4 is supported in the medial plane of the lenses so that the shutters open and close on this medial plane.

Figure 4:
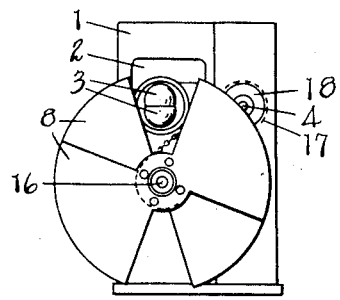
Fig. 4 is a front elevational view of a slightly modified form or embodiment of my invention.

In the embodiment shown in Fig. 4, the shaft 16 is disposed in the vertical central plane of the lenses and is driven by the sprocket chain 17 on a gear 18. The driving means, however, are not detailed as they form no part of this invention.

This arrangement is also of value in that it provides for very accurate adjustment of the shutters relative to each other. By holding one of the shutters and adjusting the arm 14, as by means of the screws 15, the other shutter is rotated or adjusted relative to the stationary shutter, thereby compensating very accurately for any variations in manufacture and accurately positioning the line or plane in which the shutter is closed.

I have not attempted to illustrate or describe other embodiments or adaptations of my invention as it is believed this disclosure will enable those skilled in the art to embody or adapt my invention as may be desired.

Shutters embodying my improvements open and close rapidly, the opening and complete closing being centered relative to the lens instead of merely passing across the same.

Having thus described my invention, what I claim as new and desire to secure by Letters Patent, is:

In a projecting machine, the combination of a projecting lens, a pair of shutters provided with diametrically opposed segmental wings, a shaft common to said shutters, one of said shutters being fixed to said shaft to rotate therewith and the other being rotatable on the shaft, facing beveled gears on said shutters, idler gears disposed between and coacting with said gears on said shutters, a rotatably adjustable supporting frame for said idler gears provided with an arm, and a pair of opposed screws for adjustably supporting said arm.

In witness whereof I have hereunto set my hand.

JAKOB BURKHARDT.